US 6,626,989 B1

(12) United States Patent
DeLuca, Jr. et al.

(10) Patent No.: US 6,626,989 B1
(45) Date of Patent: Sep. 30, 2003

(54) RUTILE TITANIUM DIOXIDE EFFECT PIGMENTS AND PRODUCTION THEREOF

(75) Inventors: Carmine V. DeLuca, Jr., Peekskill, NY (US); Louis R. Cerce, Jr., Garrison, NY (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/146,110

(22) Filed: May 16, 2002

(51) Int. Cl.$^7$ ................................................ C04B 14/20
(52) U.S. Cl. ........................ 106/417; 106/415; 106/417
(58) Field of Search ................................. 106/415, 417

(56) References Cited

U.S. PATENT DOCUMENTS

| | | | |
|---|---|---|---|
| 3,582,382 A | | 6/1971 | Watanabe et al. |
| 4,038,099 A | * | 7/1977 | DeLuca et al. ............. 106/417 |
| 5,611,851 A | * | 3/1997 | DeLuca et al. ............. 106/415 |
| 5,858,078 A | | 1/1999 | Andes et al. |

FOREIGN PATENT DOCUMENTS

| | | |
|---|---|---|
| EP | 0-649-816 | 10/1994 |
| JP | 1-264932 | 10/1989 |

* cited by examiner

*Primary Examiner*—C. Melissa Koslow
*Assistant Examiner*—Shalie Manlove

(57) ABSTRACT

A pearlescent pigment comprising substrate particles having an adherent layer of rutile titanium dioxide thereon is prepared by effecting the deposition of hydrous titanium dioxide on the substrate particles after contacting the particles at elevated pH with titanium tetrachloride.

16 Claims, No Drawings

RUTILE TITANIUM DIOXIDE EFFECT PIGMENTS AND PRODUCTION THEREOF

BACKGROUND OF THE INVENTION

Nacreous or pearlescent pigments (also more recently know as "effect pigments") which are titanium dioxide coatings on mica or glass or other substrates are well known. The pigments exhibit pearl-like and/or iridescent effects from their reflection and transmission of light. The titanium dioxide coating is actually transparent to light. However, because the coatings are extremely smooth and have a high index of refraction, they follow the laws of thin films. Part of the light which strikes each platelet is reflected and part transmitted to lower platelets where multiple reflections can occur. These multiple reflections from lower layers give a sense of depth which simulates the real pearl. Also, if the thickness of the titanium dioxide layer is controlled, interference of light occurs and the platelets act as optical filters separating light into two components. A color is seen by reflection and a complementary color by transmission.

Pearlescent pigments are used extensively in a variety of applications including plastic incorporation, automotive coatings and in cosmetics. The pearlescent pigments which are titanium dioxide coated on a mica substrate have a high index of refraction. The pigments are normally dispersed in mediums such as paint films, or nail enamel films which, when fully cured, have an index of refraction of about 1.5. The index of refraction of the pearlescent pigment must therefore be considerably higher than 1.5 if reflectivity of light is to occur. This high index of refraction is provided by the titanium dioxide layer whose index can vary between about 2.4 and 2.7. The mica substrate on which the titanium dioxide is coated has an index about 1.5 and therefore, does not take part in any reflectivity when incorporated in a film. The index of other substrates is similar. The rutile form of titanium dioxide has a higher index than the anatase form and as a result, the rutile modification will have greater reflectivity than the anatase form. Therefore, the rutile modification of titanium dioxide in a pearlescent pigment is more desirable than the anatase modification.

There are many other reasons for preferring the rutile modification. The rutile modification is more stable in outdoor weathering than is the anatase modification. The rutile modification of a titanium dioxide coated substrate results in a product which has better luster and reflectivity, better color and color homogeneity and also contains fewer small particles. In the processing stage during the formation of the titanium dioxide on the substrate, particles which are not attached to the substrate may form. These small particles, which resemble pigmentary $TiO_2$, cause light scattering. If too many small particles are present, the pearlescent appearance may be lost or diminished. The process for coating substrate in the rutile crystalline form results in very few small particles compared to the anatase form.

The formation of pigmentary $TiO_2$ in the rutile form is known. In most reported cases, the primary concern is the formation of the rutile structure since coatings are not made on a substrate such as mica. Other considerations which are of primary importance in the formation of high quality pearlescent pigments which include the maintenance of extremely smooth surfaces, uniformity of thickness and color homogeneity are not pertinent.

In contrast to the formation of pigmentary $TiO_2$, mica is, as well known, anatase directing. Thus, if mica is coated with a layer of hydrous titanium dioxide and then subjected to the normal processing methods which include washing, drying and calcining usually from 750° C. to 900° C., the titanium dioxide which is formed is in the anatase form. The presence of the mica causes the $TiO_2$ to orient in the anatase crystalline form. Such pigments have been described for example in Quinn et al. U.S. Pat. No. 3,437,515 issued Apr. 8, 1969 and Rieger et al U.S. Pat. No. 3,418,146 issued Dec. 24, 1968 and Linton U.S. Pat. No. 3,087,828.

If a rutile crystalline form is desired, the use of additives has been required. Most often, a layer of hydrous tin oxide is first precipitated on the surface of the mica followed by a layer of hydrous titanium dioxide. When this layered combination is processed and calcined, the titanium dioxide is oriented in the rutile form. This is described in detail in U.S. Pat. No. 4,038,099 and also U.S. Pat. No. 4,086,100. Other methods of forming rutile $TiO_2$ on mica substrates using tin oxide are also described.

Although many additives can aid in the formation of rutile $TiO_2$ per se, the formation of rutile $TiO_2$ on mica requires a very special additive. The coating of $TiO_2$ on the mica must be smooth and uniform. If an irregular surface is formed, light scattering takes place and the pigment no longer functions as a pearlescent pigment. The coating of $TiO_2$ must also adhere strongly to the mica or else the coating of $TiO_2$ will be separated from the mica during processing, resulting in considerable breakage and loss of luster. It is also necessary that the luster, color and color homogeneity be maintained. Small particle formation must be suppressed. Otherwise, the small particles will scatter light and diminish the pearlescent luster as was mentioned previously. An additive which is used must therefore perform many functions besides being a rutile crystalline director. It has been difficult to find an additive (other than tin) which can orient the $TiO_2$ to the rutile modification while still maintaining quality and all of the other desirable characteristics.

U.S. Pat. No. 5,433,779 teaches that if a small concentration of Fe and one or more of Zn, Ca and Mg ions are introduced into the coating prior to the start of the precipitation of hydrous titanium dioxide on mica, the precipitation proceeds as if a layer of hydrous tin oxide had been added. Complete rutile formation is achieved.

U.S. Pat. No. 6,056,815 teaches a process of making rutile titanium dioxide coated mica by first coating the mica platelet substrate with a titanium initiating layer by precipitating a Ti(III)salt solution in the presence of a constantly agitated platelet suspension. The precipitation is preferably accomplished by adjusting the pH to about 2–3, preferably about 2.4–2.8. A pH significantly lower than 2 results in a coating with an anatase structure or, at best, a mixture of anatase and rutile, while a pH significantly higher than 3 is likely to cause agglomeration. Thereafter, hydrous titanium dioxide is precipitated on the Ti(III) layer from a titanium tetrachloride bath. This process requires the use of a Ti(III) compound that is very expensive, sensitive and difficult to handle. The hydrolysis of $TiCl_3$, for example, has to be strictly controlled under an inert atmosphere to prevent oxidation and pH control during the $TiCl_3$ hydrolysis is critical, and additionally because of these considerations, the commencement of the $TiCl_4$ addition must be done under an inert atmosphere as well.

Thus, while there are additives other than tin for forming the rutile modification of titanium dioxide on a substrate such as mica while still maintaining all other desirable characteristics, the use of tin oxide is the most prevalent method used to make in commercial rutile titanium dioxide coated micas.

There are, however, two major disadvantages to the use of tin to make rutile $TiO_2$ coated substrates such as mica. The first is that tin oxide is not permitted in polymer compositions which are to be used in contact with food. Thus, any high quality pearlescent or interference pigment which contains tin oxide cannot be used to color the polymer film. The second is that in some countries, the presence of tin oxide may not be permitted in cosmetic products. Cosmetic manufacturers are therefore faced with a choice of either formulating cosmetic products destined for such countries with anatase only products and having a second line of the same products for the rest of the world formulated with rutile products or having a single anatase product line for the entire world. The result is that polymer formulations in contact with food and cosmetic lines to be used worldwide use anatase products even though the rutile $TiO_2$-coated products have better color, color homogeneity and luster.

It is therefore the object of this invention to provide a pearlescent pigment of a titanium dioxide coated substrate in which the titanium dioxide is in the rutile crystalline form and in which tin has not been used to promote rutilization. A further object of this invention is to provide a rutile $TiO_2$-coated substrate which has the same advantages and characteristics of the tin containing product which includes luster, color, color homogeneity and few small particle formation during manufacture. These and other objects of the invention will become apparent to one of ordinary skill in this art from the following detailed description.

SUMMARY OF THE INVENTION

This invention relates to high quality $TiO_2$-coated micaceous pearlescent pigments. If hydrous titanium dioxide is deposited from a titanium tetrachloride solution onto a micaceous slurry at an initially relatively high pH and thereafter at a relatively low pH, the precipitation of hydrous titanium dioxide on the mica proceeds as if a layer of hydrous tin oxide had been added. Complete rutile formation is achieved. Both the pearl color and also the interference colors are formed that have the same quality and characteristics as the tin oxide-containing counterparts.

DESCRIPTION OF THE INVENTION

In accordance with the present invention, high quality $TiO_2$-coated substrate pearlescent pigments are formed in which the $TiO_2$ is in the rutile form as a result of the use of $TiCl_4$ and the use of a rutile directing additive(s) or coating is not necessary.

A pearlescent pigment which comprises particles having an adherent layer of rutile titanium dioxide and which does not contain tin or other elements as a rutile promoter is achieved by precipitating the hydrous titanium dioxide on a substrate such as mica from a $TiCl_4$ bath. The procedure is generally the same as that employed to form a $TiO_2$-coated substrate with the exception of pH control.

In the coating process, the substrate such as mica is dispersed in water, which is preferably distilled. Although muscovite mica is the preferred mica because of its white color, other micas can be used which include phlogopite, lipidolite or synthetic micas. Other substrates such as glass, kaolin, aluminum, bismuth oxychloride, silica and the like can also be used.

The average particle size of the substrate such as mica which is used can vary from an average particle size of about 3 microns to an average particle size of about 100 microns. The concentrations of the substrate in the water can vary from about 5% to 25%. The generally preferred concentration varies between about 10% to 20%.

After the substrate is dispersed in the water, it is placed in an appropriate vessel and the pH of the slurry is adjusted using a base such as NaOH to at least 8, more preferably, about 10 or more, and most preferably about 10 to 11. The $TiCl_4$ is then introduced.

The $TiCl_4$ is employed in the form of a solution in any convenient solvent although an aqueous solution is preferred. The pH of this solution is acidic and it needs to be added to the highly basic slurry such that the pH remains at a value of at least 8, more preferably about 10 or more, and most preferably about 10 to 11. This can be accomplished by metering the acidic solution into the basic slurry at an appropriate rate. If desired, additional base can be added to the combined materials. It is preferred, although not necessary, to conduct the contacting at elevated temperature of about 60–90° C. and preferably about 70–80° C.

After a period of time, the pH is then lowered to below about 2, and preferably to about 1.4 to 1.6, for example by addition of a suitable acidic reagent such as a 1:1 HCl:water solution. The period of time can be varied considerably and a suitable period determined by a few brief trial runs. In general, the time will be about 0.25 to 2 hours, and preferably about 0.5 to 1 hour.

The pH at which the hydrous titanium dioxide is precipitated is important. Above about pH 2, complete rutilization will not occur. Below that value, it is dependent on the particular system although complete rutilization is formed at about pH 1.6 and a pH below about 1 should be avoided. Generally, the pH should be at least about 1.4.

Other than the modifications noted above, the procedure to form the additive free, rutile titanium dioxide-coated substrate pigment is conventional.

The products of this invention can find use in, without limitation, the cosmetic, automotive and industrial sectors. For example, in cosmetics these pigments can be used in the lip/eye area and for all external and rinse off applications. Thus, they can be used in lip gloss, lip rouge (cream), lipstick, mascara cake/cream, nail enamel, nail enamel remover, perfume lotion, pre-electric shave lotion, shampoos of all types (gel or liquid), shaving cream (concentrate for aerosol, brushless, lathering), skin glosser stick, skin makeup (liquid, pomade) sunscreen lotion, leg makeup, insect repellent lotion, hair spray, hair groom, face powder (loose/pressed), eye shadow (stick, powder, pomade, liquid, cream, pressed), eye liner, dusting powder, cologne stick, cologne (emollient), cologne, bubble bath, body lotion (moisturizing, cleansing, astringent, analgesic), after-shave lotion and after-bath milk. The pigments of this invention have an unlimited use in all types of automotive (exterior) and industrial coating applications (interior or exterior). These pigments can be used in mass tone or as styling agents to spray paint all types of automotive or non-automotive vehicles. Similarly, they can be used with clay/formica/wood/glass/metal/enamel/ceramic and other non-porous or porous surfaces. They can be incorporated into plastic articles geared for the toy industry or the home. These pigments can be used to improve the look of rubber, vinyl/marble flooring, vinyl siding and all other vinyl products. Also, these colors can be used in modeling hobbies of all types, including ships, airplanes, trains and automobiles. This list of uses is intended to be illustrative rather than limiting.

Various non-limiting examples are set forth below to further illustrate the present invention. In these, as well as throughout the balance of this specification and claims, all parts and percentages are by weight and all temperatures are in degrees Centigrade unless other indicated.

EXAMPLES 1–9

A coating procedure was adopted in which 200 grams of muscovite mica having an average particle size of about 18 microns (by laser light scattering) were dispersed in 1 liter of water and heated, with stirring at 250–300 rpm, to 74° C. The pH of the slurry was adjusted to 10 using a 35% aqueous sodium hydroxide solution. Then 10 ml of a 50% aqueous $TiCl_4$ solution was added at 2 ml/min while maintaining the pH constant at 10. Forty minutes after the addition was complete, the pH was lowered to 1.6 using aqueous HCl and additional 50% aqueous $TiCl_4$ solution was added at 1 ml/min while maintaining the pH constant at 1.6. The titanium introduction was continued until either a white pearl or interference colors which include gold, red, blue and green had been reached. When the desired end point was achieved, the slurry was filtered on a Buchner Funnel and washed with additional water. The coated platelets were then dried and calcined at 850–900° C. Samples were analyzed for the percentage of rutile and anatase that was present in each sample by x-ray diffraction. The results are shown in Table 1.

TABLE 1

| Color | % Anatase | % Rutile |
|---|---|---|
| Pearl | 0 | 100 |
| Gold | 0 | 100 |
| Red | 0 | 100 |
| Blue | 0 | 100 |
| Green | 0 | 100 |

For comparison purposes, a number of different pigments were prepared at various thicknesses by the same procedure but without adding the $TiCl_4$ at pH 10. The x-ray diffraction results are shown in Table 2

TABLE 2

| Color | % Anatase | % Rutile |
|---|---|---|
| Pearl | 95 | 5 |
| Gold | 86 | 14 |
| Blue | 63 | 37 |
| Green | 60 | 40 |

The luster quality of the pigments produced in the foregoing fashion are determined by reflectance measurements made on standard drawdowns on a hiding power chart (Form 2–6 Opacity Charts of The Leneta Company), half of which is black and half of which is white. A coating on the black part of this chart displays the reflection color when it is examined by specular reflection while the coating on the white portion displays the transmission color when it is viewed at an angle which is not equal to the angle of incidence.

The standard drawdowns are prepared by suspending 3% pigment in a nitrocellulose lacquer which contains

| Nitrocellulose RS type 15–20 sec. | 2.9% |
|---|---|
| Nitrocellulose RS type 30–40 sec. | 6.6 |
| Isopropanol | 5.1 |
| Amylacetate | 44.8 |

-continued

| n-Butyl acetate | 37.6 |
|---|---|
| Mono-butoxydiethylene glycol | 3.0 |
| | 100.0% |

The two grades of nitrocellulose provide the desired combination of solids content and a viscosity of approximately 2000 centipoises at 25° C. The mono-butoxy-diethylene glycol is used to prevent "blushing" or clouding of the lacquer film by condensation of water vapor from the atmosphere.

The drawdowns are made with a Bird film applicator which produces a wet film of approximately 0.003 inch (about 0.008 cm) thickness on the hiding power chart held firmly against a Bird vacuum plate. The spectrophotometric curve of the sample is determined with a Leres Trilac spectrophotometer using an angle of incidence of viewing of 15° to the normal. The reflectance is measured relative to a pressed cake of barium sulfate. Reflectance at the maximum ($R_{max}$) and the average reflectance are measurements of pearlescent or nacreous luster. The wavelength at the maximum is an indication of color, although the entire curve is required to describe the color completely.

In all cases, the procedure of the invention produces products with quality equal to or exceeding the products which contained Sn. All the products were 100% rutile with no anatase present.

EXAMPLES 10–11

Example 1 was repeated twice changing the pH of the mica slurry to either 5 or 7. In both cases, the titanium dioxide was found to be a mixture of anatase and rutile. The amount of anatase was greater when the slurry had a pH of 5

EXAMPLE 12

Example 1 was repeated except that the mica is replaced with the same amount of glass platelets. A rutile $TiO_2$-coated glass effect pigment is realized.

Various changes and modifications can be made in the products and process of the present invention without departing from the spirit and scope thereof. The various embodiments which have been disclosed herein were set forth for the purpose of illustrating the invention but were not intended to limit it.

What is claimed is:

1. A pearlescent pigment comprising a plurality of particles having an adherent layer of rutile $TiO_2$ thereon, the pigment being free of metal or other rutile directing additive deposited on the particles.

2. The pearlescent pigment of claim 1 in which the particles comprise mica.

3. The pearlescent pigment of claim 2 in which the $TiO_2$ layer is of pearl thickness.

4. The pearlescent pigment of claim 2 in which the $TiO_2$ layer is of interference thickness.

5. In the method of forming a rutile titanium dioxide-coated particulate substrate pearlescent pigment in which hydrous titanium dioxide is deposited on the substrate particles followed by calcining, the improvement which comprises effecting the titanium deposit by combining the substrate particles with $TiCl_4$ at a high pH and then lowering the pH so as to effect deposition the hydrous $TiO_2$ thereon.

6. The method of claim 5 in which the substrate particles are micaceous particles and the pH prior to lowering is at least about 10.

7. The method of claim 6 in which the pH is lowered to about 1 to 2.

8. The method of claim 7 in which the pH is lowered to about 1.4 to 1.6.

9. The method of claim 5 in which the pH is lowered to about 1 to 2.

10. The method of claim 9 in which the pH is lowered to about 1.4 to 1.6.

11. A method for the preparation of a pearlescent pigment which comprises, in sequence and in the absence of exogenous metal and Ti(III), contacting substrate particles with a titanium tetrachloride-containing coating bath at a high pH;

coating the substrate particles with titanium dioxide in the hydrous form at acid pH by deposition from the titanium tetrachloride-containing coating bath at a low pH;

removing the titanium dioxide particles from the coating bath and washing said particles to remove excess acid and impurities therefrom; and calcining said particles at a temperature in excess of 650° C. to produce a translucent coating of titanium dioxide in the rutile crystalline form thereon.

12. The method of claim 11 in which the substrate particles are micaceous particles and the high pH is at least about 10.

13. The method of claim 12 in which the low pH is about 1 to 2.

14. The method of claim 13 in which the low pH is about 1.4 to 1.6.

15. The method of claim 11 in which the low pH is about 1 to 2.

16. The method of claim 15 in which the low pH is about 1.4 to 1.6.

* * * * *